Sept. 7, 1948. W. A. BOHANNON 2,448,856
ELECTRIC HEATING DEVICE
Filed Oct. 2, 1945
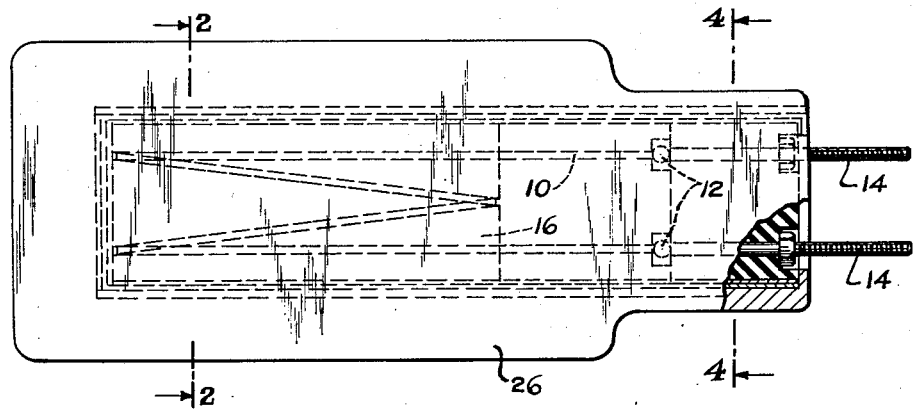
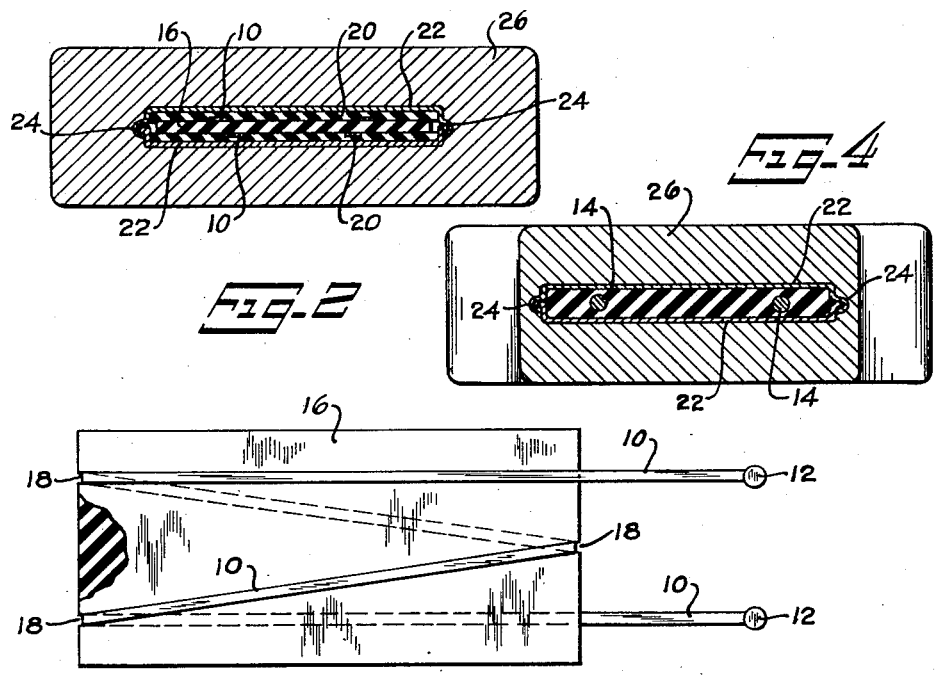
INVENTOR.
WILLIAM A. BOHANNON.
BY
ATTORNEY

UNITED STATES PATENT OFFICE 2,448,856

ELECTRIC HEATING DEVICE

William A. Bohannon, Uniondale, N. Y.

Application October 2, 1945, Serial No. 619,791

2 Claims. (Cl. 201—63)

My invention relates to electric heating devices for domestic cooking or heating units such as stoves, toasters, chafing dishes, grills, plate warmers, ice trays, percolators, soldering irons, etc., and more particularly to electric heating devices of the so-called "enclosed" type, i. e., a type in which the heating element is enclosed in an electrical non-conducting or refractory material which is in turn embedded in a suitable metal casting—the heat transfer being by conduction from the element to the casting and thence to the utensil or other substance which it is desired to heat.

One object of the invention is to provide an improved and simplified method by which electric heating devices of the enclosed type may be fabricated and made more economical and satisfactory than heretofore.

Another object of the invention is to provide for the enclosed or embedded electric heating element a protective armor or casing to the end that the former, regardless of the use to which the device is put, is made both air and moisture proof and endowed with a longer useful life.

A further object of the invention is to provide an electric heating device which, if fabricated in accordance with the method herein taught, is more or less indestructible, cannot be short circuited, may be washed or polished without injury, may be made of any desired size or shape, is inexpensive to manufacture, and is usable in any environment where need for an electric heating device exists.

A still further object of the invention is to utilize the shrinkage inherent in a casting after pouring to compress and compact into a unit assembly those parts of the device required to be embedded in the casting and which, if not so compacted, might conceivably be injured due to careless or rough handling of the device.

Other objects and advantages of the invention will be hereinafter set forth.

In the drawings, wherein like reference characters denote like or corresponding parts:

Figure 1 is a plan view, partly broken away, showing by way of example an electric heating device in the form of a hot plate for an electric stove;

Figure 2 is an enlarged transverse sectional view taken on the line 2—2 of Figure 1;

Figure 3 is a plan view showing the manner in which the resistance wire of the heater element is wound on a suitable core; and Figure 4 is a section on the line 4—4 of Figure 1.

While in the embodiment of the invention selected for illustration a hot plate for an electric stove is shown, it is to be understood that the heating device may be made of any size or shape desired depending upon the particular use to which it is to be put. In other words, I do not wish to limit myself to any particular type or form of casting. Nor do I wish to limit myself to any particular metal in the making of the casting notwithstanding the fact that I have found aluminum and its alloys entirely satisfactory in this regard.

I am aware of the fact that conduction heaters of the enclosed type are, per se, old. Usually in such heaters the heating element is pressed tightly between mica or some other refractory material and encased in a sheet metal covering, or enclosed in a refractory material which is compressed and fired, or, if not so encased, covered with either ceramic beads or sleeves for insulation and protection. Other enclosed types include the so-called sheath-wire or calrod elements which consist of refractory metal tubing inside of which is the resistor element surrounded with magnesium oxide. In this latter type the outer tubular casings are drawn or swaged to the required diameter, thus putting the insulation under pressure. Moreover, it is not uncommon in the manufacture of the enclosed type electric heaters to place the heating element in a mold and pour molten metal around it to thus form what is generally referred to as a "cast-in" type.

The present invention is an improvement on the foregoing types. As shown in Figure 3, the resistor or Nichrome wire 10 of the heater is provided at its opposite ends with terminal portions 12 to which binding posts 14 are secured by any suitable means. Intermediately of its ends the wire 10 is wound around a core 16 of mica or other refractory material having notches 18 formed therein to hold the wire in place. The thus assembled unit is then effectively insulated by placing on each side thereof a sheet 20 of insulating material such as mica, and with the sheets thus positioned, the unit as a whole is then completely encased in a so-called protective armor or metal casing 22—care being exercised to make sure that the ends and edges of the casing halves extend beyond the corresponding ends and edges of the core. For convenience in handling, after assembly of the unit comprising the resistor 10, core 16, insulation 20 and casing 22, it is desirable that the two halves comprising the casing be joined along their opposite edges either by spot welding or by being made to overlap and interlock as indicated at 24.

As previously stated, the heater of the present invention is of the "cast-in" or unit type. In this connection it may be pointed out that I have found by experience that it is inadvisable and unsafe to make the casing 22 of metal the same as that used in pouring the metal casting. If the same metal is used, experience teaches that in a goodly number of pourings not only is the armor or casing 22 destroyed, but in addition, though in a lesser number of cases, the resistance wire 10 also. Accordingly, and to cure the objectionable aspect of the situation, I prefer to make the casing 22 out of a metal having a higher melting temperature than that of the metal of the casting 26. For example, if molten aluminum is used as the casting metal, any metal such as thin sheet iron or the like may be used as the metal for the casing 22. This difference in melting temperature between the two selected metals, however, raises another problem, i. e., one of lack of affinity of the different metals used. This latter problem I effectively meet and overcome by coating or metalizing the outer surface of the casing with a metal the same as that selected for the casting 26. By so doing, the desired affinity of the one metal to the other is established and all tendency to destroy both the casing 22 and the resistor 10 in a casting operation is avoided.

The actual pouring of the casting is more or less routine. All that is required is that the heating unit to be embedded in the casting be so positioned in the mold (not shown) as to admit of the flow of the molten metal around and over the outer surface of the casing 22—after which, due to the inherent shringage of the poured metal incident to cooling, a compacting or compressing of the embedded assembly takes place, i. e., a compacting of such magnitude that the casing 22, the insulation 20 and heating element 10 become in effect a solid or unit mass tending not only to hold the winding stationary by pressing the insulating material between the coils, but to add greatly to the indestructibility and longevity of the unit device.

An electric heating device fabricated and characterized as above set forth requires less current to obtain equal temperature to that obtained in other "enclosed" types making use of powder insulation, reaches its maximum temperature more rapidly, is less expensive to operate and to manufacture, is safe, cannot be short circuited by contact with water or other liquids even when used as an immersion heating device, and is not injured by spillings thereon or by cleaning, polishing or rough handling during use.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an electric heater, a refractory core, a flexible resistor element laced over and around said core, sheets of insulating material disposed one each on opposite sides of said core, a metallic casing within the embrace of which the assembly comprising the core, resistor element and insulating material is enclosed, said casing comprising separable casing halves disposed one each on opposite sides of said assembly, and a metallic casting within which said casing is embedded, said casting having an exposed outer surface against which the article to be heated is adapted to bear, the metal of said casting having a melting temperature lower than that of the metal of said casing whereby, in cooling, after pouring, the metal of said casting is adapted to shrink, and by reason of said shrinkage, so compress the casing halves as to hold said assembly firmly in place therebetween.

2. In an electric heater, a refractory core, a flexible resistor element laced over and around said core, sheets of insulating material disposed one each on opposite sides of said core, a metallic casing within the embrace of which the assembly comprising the core, the resistor element and the insulating material is enclosed, said casing comprising separable casing halves disposed one each on opposite sides of said assembly, a metalized coating bonded to the outer surface of said casing, the metal of said coating having a lower melting temperature than that of the metal of said casing halves, and a metallic casting within which said casing is embedded, said casting having an exposed outer surface against which the article to be heated is adapted to bear, the metal of said casting having a melting temperature substantially the same as the melting temperature of the metal of said coating whereby, in cooling, after pouring, the metal of said casting is adapted to shrink, and by reason of said shrinkage, so compress the casing halves as to hold said assembly firmly in place therebetween and at the same time cause the metal of said casting to adhere, through bonding, to the metal-coated casing wall.

WILLIAM A. BOHANNON.

REFERENCES CITED

The following references are of record in the file of this patent:

UNITED STATES PATENTS

| Number | Name | Date |
|---|---|---|
| 522,718 | Leonard | July 10, 1894 |
| 877,843 | Hoskin | Jan. 28, 1908 |
| 1,451,880 | Lightfoot I | Apr. 17, 1923 |
| 1,464,255 | Zimmermann | Aug. 7, 1923 |
| 1,617,489 | Lightfoot II | Feb. 15, 1927 |
| 2,403,022 | Reimers | July 2, 1946 |